INVENTORS
WERNER FIDI
OTTO MARSCHALL
MICHAEL KLEMENCIC

BY Mayleward Toren
ATTORNEYS 3,526,793
TRANSDUCER FOR CONVERTING ELECTRICAL OSCILLATIONS INTO TORSIONAL VIBRATION AND VICE VERSA
Werner Fidi, Otto Marschall, and Michael Klemencic, Vienna, Austria, assignors to Akustische u. Kino-Gerate Gesellschaft m.b.H., Vienna, Austria
Filed Nov. 25, 1968, Ser. No. 778,603
Int. Cl. H02k 33/18
U.S. Cl. 310—36                                    6 Claims

ABSTRACT OF THE DISCLOSURE

A transducer, for converting electrical oscillations into torsional vibration and vice versa, includes a rotary moving coil disposed in an air gap defined by a magnetic circuit. A helical spring, having at least one turn, has a portion coupled to the moving coil for rotation or oscillation as a unit with the coil. The moving coil and each of the turns of the spring have at least approximately the same moment of inertia. The coil has diametrically opposite portions disposed in the air gap and spaced apart by approximately two-thirds the diameter of the spring turns. The moving coil has, in the air gap, an effective length which is approximately as large as the diameter of the turns of the spring.

BACKGROUND OF THE INVENTION

In systems for producing artificial reverberation with the aid of helical springs to which torsional vibration is imparted, the most widely used reverberation devices include a helical spring, or a plurality of parallel springs, disposed betweeen two transducers. The first transducer is an actuating transducer, which converts electrical oscillations into torsional vibrations, and these torsional vibrations are imparted to the helical spring at one end thereof. The second transducer derives electrical oscillations from the mechanical torsional vibrations which appear, after a time delay, at the other end of the helical spring.

This known arrangement has various disadvantages. For instance, previously known transducers have poor efficiency and consequently only a low sensitivity, so that a high additional amplification is required. In addition, the torsional vibration which can be imparted to the helical springs has only a small amplitude, because non-linear distortions otherwise result, and these are most undesirable in the reverberation.

The only remedy is to restrict the contrast of the oscillations to be reverberated, and to use a pick-up transducer which is as sensitive as possible and, despite small amplitudes, produces a relatively high electrical output voltage.

Known transducers used in reverberation devices for converting electrical oscillations into torsional vibration and vice versa meet these requirements to only an unsatisfactory degree.

SUMMARY OF THE INVENTION

This invention relates to transducers for use in systems for producing artificial reverberation with the aid of helical springs to which torsional vibration is imparted. More particularly, the invention relates to a greatly improved and more efficient transducer which is superior to known transducers in its frequency response, sensitivity and absence of distortion.

To this end, the invention is directed to a transducer, for converting electrical oscillations into torsional vibrations and vice versa, which comprises a rotary moving coil movable in the air gap of a magnetic circuit and coupled to at least one helical spring. In accordance with the invention, the moment of inertia $I_1$ of the moving coil is at least approximately as large as the moment of inertia $I_2$ of a turn of the helical spring coupled thereto. The effective length of the moving coil in the air gap is approximately as large as the turn diameter of the helical spring, and the distance between diametrically opposite parts of the coil in the air gap is approximately two-thirds of the diameter of the turns of the helical spring.

Provided that certain conditions are satisfied, the above dimensions will result in an optimum sensitivity. Thus, to insure a transmission up to the limiting frequency, above which torsional vibration cannot be imparted to the spring because only transverse and compressional vibrations result, the moment of inertia $I_1$ of the actuating or pick-up transducer must not exceed the moment of inertia $I_2$ of a turn of the spring. The coil assembly itself must be designed so as to prevent resonant vibration within the frequency range to be transmitted, so that the length of the two longer sides of the coil must not exceed a maximum L. Transmission is possible only up to the fundamental resonant frequency of the coil frame.

In a particularly advantageous and stable embodiment of a frame-like moving coil in accordance with the invention, the two end members of the coil frame are angled outwardly so that the vertices of the angles lie opposite to each other on the axis of rotation of the coil. These vertices thus form corners of a hexagon, and one vertex is firmly connected to the helical spring and the other vertex to the mounting. The connections are established by hooking the respective vertex into the part to which it is to be connected, and subsequently adhesively bonding the vertex to the connecting means and the part, preferably with a synthetic resin. The stiffening produced by the resulting fillet of adhesive will prevent any warping or distortion of the moving coil by the tensile force which is exerted on the coil by the helical spring.

As the efficiency of the transducer embodying the invention depends furthermore on the design of the magnetic circuit, advantageously the magnetic circuit comprises two permanent magnets and a tongue of magnetic material connecting the mutually adjacent ends of the two magnets to the iron core which defines the air gap.

For increased stability and insensitivity to mechanical shock, it is further advantageous to provide a bearing, which bearing is disposed between the rotary coil frame and the helical spring. This bearing guides the rotary coil frame for movement in the air gaps of the magnetic circuit.

An object of the invention is to provide an improved transducer for use in reverberation devices for converting electrical oscillations into torsional vibration and vice versa.

Another object of the invention is to provide such a transducer comprising a rotary moving coil movable in the air gap of a magnetic circuit and coupled to at least one helical spring.

A further object of the invention is to provide such a transducer which is superior to known transducers in its frequency response, sensitivity, and absence of distortion.

Another object of the invention is to provide such a transducer including an improved magnetic circuit in association with the rotary moving coil.

A further object of the invention is to provide such a transducer in which the moving coil has a novel configuration and parameters resulting in an optimum sensitivity.

Yet another object of the invention is to provide such a transducer including means for greatly increasing the stability and insensitivity to mechanical shock of the rotary moving coil.

For an understanding of the principles of the invention, reference is made to the following description of typical embodiments thereof as illustrated in the accompanying drawings.

DESCRIPTION OF THE PREFERRED EMBODIMENTS

Figure 1:
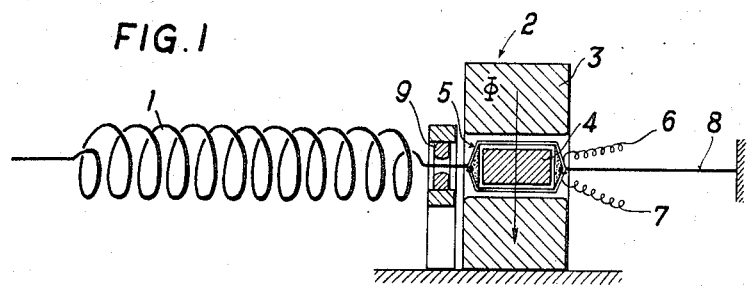
FIG. 1 is a somewhat diagrammatic sectional view of a transducer embodying the invention.

Referring to the drawings, and particularly to FIG. 1, the helical spring, for transmitting the signal to be delayed, is indicated at 1. For the purpose of simplifying the illustration, only part of helical spring 1 and a transducer 2, at one end of spring 1, are shown. As the arrangement is symmetrical, the transducer 2 may be considered either as an actuating transducer or as a pick-up transducer.

In either case, the transducer comprises a magnetic circuit 3 which produces flux lines $\Phi$ across an aperture in which there is inserted an iron core 4 to define a cylindrical air gap. This air gap receives a frame-like rotary moving coil 5 having electric leads 6 and 7. A mounting 8, comprising an easily movable, thin, but strong wire is connected to one end of coil-frame 5 and extends along the axis of rotation of the latter. At the other end, coil-frame 5 is firmly connected to helical spring 1. A bearing 9, preferably consisting of a rubber plate, is disposed between helical spring 1 and the adjacent end of coil-frame 5. Bearing 9 serves to center and reliably guide rotary moving coil 5, and prevents damage to the latter from strong mechanical shock.

Figure 2A:
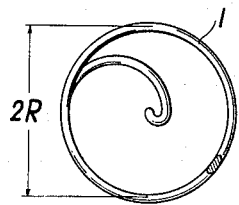
FIGS. 2A and 2B are, respectively, a transverse section and a longitudinal section of a rotary moving coil embodying the invention, and its associated connections.
Figure 2B:
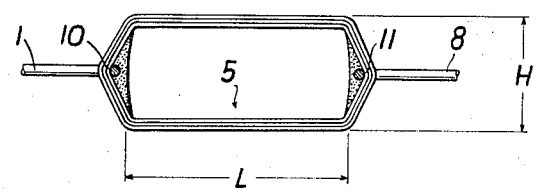

FIGS. 2A and 2B illustrate the rotary moving coil and helical spring, embodying the invention, to a larger scale. It will be clear, from FIG. 2B, that in an axial sectional view through the axis of rotation of coil-frame 5, the coil-frame has a configuration which is similar to a flattened hexagon because the two end members are angled. This design facilitates fixation of mounting 8 and helical spring 1. These parts are first hooked into coil-frame 5 at 10 and 11, respectively, and are then adhered to the coil-frame. A suitable synthetic resin preferably is used for this purpose. The bond must be so made as to form a fillet, which stiffens coil-frame 5 at both ends so as to prevent warping or distortion of the coil frame by the tensile strength of the helical spring 1.

Figure 3:
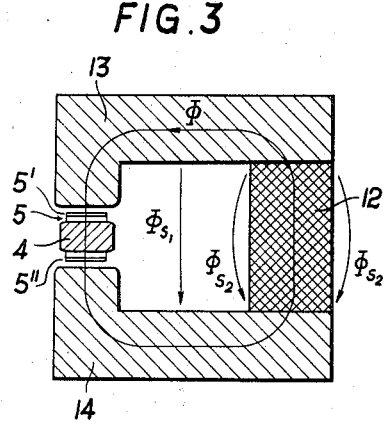
FIGS. 3 and 4 are longitudinal sectional views of magnetic systems for the transducer embodying the invention.
Figure 4:
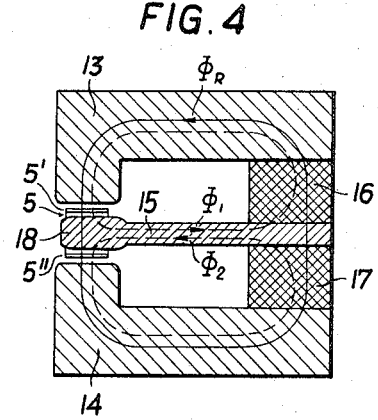

As will be clear by reference to FIG. 1, the longitudinal members of rotary coil-frame 5 move in the air gaps which are traversed by the flux lines of a magnetic circuit. FIGS. 3 and 4 illustrate two different embodiments of magnetic circuits which are suitable for a transducer embodying the invention.

Referring to FIG. 3, one form of magnetic circuit in accordance with the invention comprises only one permanent magnet 12 which generally has a prismatic shape. Magnet 12 has associated therewith soft iron elements 13 and 14, each at a respective opposite end of magnet 12 or at a respective pole face of the latter. These soft iron elements have free ends which, conjointly with iron core 4, define two air gap portions 5′ and 5″ in which rotary moving coil 5 is movable. This magnetic circuit is substantially a conventional design. However, a circuit having a much smaller leakage and a higher efficiency is diagrammatically illustrated in FIG. 4.

Referring to FIG. 4, the improved magnetic circuit illustrated therein comprises two permanent magnets 16 and 17 having a soft iron tongue 15 disposed therebetween. Tongue 15 includes a portion 18, which is enlarged in thickness, and replaces the iron core 4 of FIG. 3. The outer part of the magnetic circuit is formed, in the same manner as in FIG. 3, by the two soft iron elements 13 and 14. Soft iron tongue 15 acts to reduce the leakage, in a manner which will now be described.

In the arrangement shown in FIG. 3, the main flux $\Phi$ traverses the two limbs 13 and 14 and the iron core 4. A very strong leakage flux $\Phi_{S_1}$ is produced between the two soft iron elements 13 and 14, and a very strong leakage flux $\Phi_{S_2}$ is produced at the edges of permanent magnet 12 owing to the relatively large length of the latter. In accordance with the law of superposition, the introduction of a soft iron tongue 15 results in the production of two magnetic fluxes $\Phi_1$ and $\Phi_2$, one in the soft iron element 13 and in the magnetizible tongue 15 and the other in the soft iron element 14 and the magnetizible tongue 15. The polarities of the permanent magnets 16 and 17 are such that the fluxes in the two soft iron elements offset or cancel each other in the indicated area of tongue 15.

In the design of the magnetic system as shown in FIG. 4, the configuration of the field is changed, so that part of the leakage flux $\Phi_{S_1}$ is virtually recovered, and the smaller height or lengths of magnets 16 and 17 also reduces the leakage flux $\Phi_{S_2}$ in the magnetic circuit, so that the overall flux $\Phi$ in the air gap is proportionally increased.

Referring again to FIGS. 2A and 2B, it will be noted that the diameter of the coil frame H is approximately two thirds of the diameter 2R of a turn of spring 1. Furthermore, the length L of moving coil 5 in the air gap is at least approximately as large as the diameter 2R of a turn of helical spring 1.

The transducer embodying the invention and described above may be used, without restriction, as an actuating transducer or as a pick-up transducer, for all reverberation devices including helical springs to which torsional vibration is imparted. For economic reasons, the transducer will be used only as an actuating transducer if merely a low electric actuating power is available. It is generally less expensive to produce a higher electric power than to provide a transducer of high sensitivity. For this reason, one of the usual transducers, comprising a rotary moving magnet, may be used for actuation without loss of quality, provided that a pick-up transducer embodying the invention and having a high sensitivity is used at the other end of the helical spring.

What is claimed is:

1. A transducer, for converting electrical oscillations into torsional vibrations and vice versa, comprising, in combination, a magnetic circuit defining an air gap; a rotary moving coil positioned in said air gap; and a helical spring having at least one turn and having a portion coupled to said moving coil for rotation as a unit with said moving coil; and wherein, to assure optimum sensitivity, said moving coil and each of the turns of said spring have, at least approximately, the same moment of inertia to insure transmission of torsional vibrations up to the limiting torsional vibration frequency of said spring, with the upper limit of the moment of inertia of said moving coil being the moment of inertia of the spring turns, the effective length of said moving coil in said air gap is approximately as large as the diameter of the turns of said spring, whereby to prevent resonant vibration within the frequency range to be transmitted, and said coil has diametrically opposite portions disposed in said air gap and spaced by approximately two-thirds the diameter of the turns of said spring.

2. A transducer, for converting electrical oscillations into torsional vibration and vice versa, as claimed in claim 1, in which said coil is rotatable on an axis and has the configuration of a hexagon having two opposite corners disposed on said axis; a hooked and adhered joint connecting one of said opposite corners to said helical spring; and a mounting connected to the other of said opposite corners by a hooked and adhered joint.

3. A transducer, for converting electrical oscillations into torsional vibration and vice versa, as claimed in claim 2, in which said helical spring is a tension spring; said joints comprising fillets of synthetic resin adhesive resisting warping and distortion of said coil under the action of tension exerted by said spring on said coil.

4. A transducer, for converting electrical oscillations into torsional vibration and vice versa, as claimed in claim 3, in which said magnetic circuit includes two permanent magnets having mutually adjacent ends; a soft iron core defining two portions of said air gaps on opposite sides of said core; and a soft iron tongue connecting said mutually adjacent ends of said magnets to said core; said coil being disposed in both said air gap portions.

5. A transducer, for converting electrical oscillations into torsional vibration and vice versa, as claimed in claim 3, including a bearing positioned between said coil and said helical spring and mounting said coil for rotation on said axis.

6. A transducer, for converting electrical oscillations into torsional vibrations and vice versa, as claimed in claim 4, in which said mutually adjacent ends of said two permanent magnets have respective opposite polarities.

References Cited

UNITED STATES PATENTS

| | | | |
|---|---|---|---|
| 3,288,931 | 11/1966 | Burger | 179—1.6 |
| 3,419,825 | 12/1968 | LaManna | 333—30 |
| 2,112,560 | 3/1938 | Davies | 333—71 |
| 3,217,485 | 11/1965 | Musser et al. | 58—2 |
| 3,402,371 | 9/1968 | Weingartner et al. | 333—72 XR |
| 3,391,250 | 7/1968 | Klaiber et al. | 333—30 XR |
| 2,728,188 | 12/1955 | Hettich | 58—107 |
| 2,810,888 | 10/1957 | George et al. | 333—30 XR |
| 3,080,538 | 3/1963 | Johnson | 333—71 |
| 2,670,460 | 2/1954 | Gilbert | 333—71 |
| 2,313,290 | 3/1943 | Bethenod et al. | 310—25 XR |
| 3,177,385 | 4/1965 | Montequ | 310—36 |

FOREIGN PATENTS 959,370  6/1964  Great Britain.

MILTON O. HIRSHFIELD, Primary Examiner

B. A. REYNOLDS, Assistant Examiner

U.S. Cl. X.R.

179—1.6; 318—119; 333—71